(12) United States Patent
Dakss et al.

(10) Patent No.: US 9,881,584 B2
(45) Date of Patent: Jan. 30, 2018

(54) SYSTEM AND METHOD FOR PRESENTING CONTENT WITHIN VIRTUAL REALITY ENVIRONMENT

(71) Applicant: NBCUniversal Media, LLC, New York, NY (US)

(72) Inventors: Jonathan Dakss, Englewood Cliffs, NJ (US); Ali A. Khorram, Philadelphia, PA (US); Samuel Harrell, Englewood Cliffs, NJ (US)

(73) Assignees: NBCUNIVERSAL MEDIA, LLC, New York, NY (US); COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 14/850,555

(22) Filed: Sep. 10, 2015

(65) Prior Publication Data

US 2017/0076498 A1    Mar. 16, 2017

(51) Int. Cl.
| | |
|---|---|
| *G09G 5/00* | (2006.01) |
| *G06F 3/01* | (2006.01) |
| *G06T 19/20* | (2011.01) |
| *H04N 21/81* | (2011.01) |
| *G06F 3/147* | (2006.01) |

(52) U.S. Cl.
CPC ............ *G09G 5/006* (2013.01); *G06F 3/011* (2013.01); *G06F 3/147* (2013.01); *G06T 19/20* (2013.01); *H04N 21/812* (2013.01); *G06T 2219/2004* (2013.01); *G09G 2354/00* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 2008/0031600 A1* | 2/2008 | Robey .................... | G06Q 30/02 386/249 |
| 2009/0279784 A1* | 11/2009 | Arcas ..................... | G06T 17/00 382/190 |
| 2013/0124311 A1* | 5/2013 | Sivanandan .......... | G06Q 30/02 705/14.51 |

* cited by examiner

*Primary Examiner* — Frank Chen
(74) *Attorney, Agent, or Firm* — Lee, Hong, Degerman, Kang & Waimey

(57) ABSTRACT

Systems and methods for presenting two-dimensional (2D) content within a virtual reality (VR) presentation are disclosed. Some embodiments include providing the VR presentation to a user, receiving information of the 2D content for display during the VR presentation from an external source and obtaining location information related to a display location within the VR presentation for displaying the 2D content. The 2D content may be displayed at the display location based on the received information and the location information, wherein the display location corresponds to a 2D display rendered within the VR presentation.

18 Claims, 9 Drawing Sheets

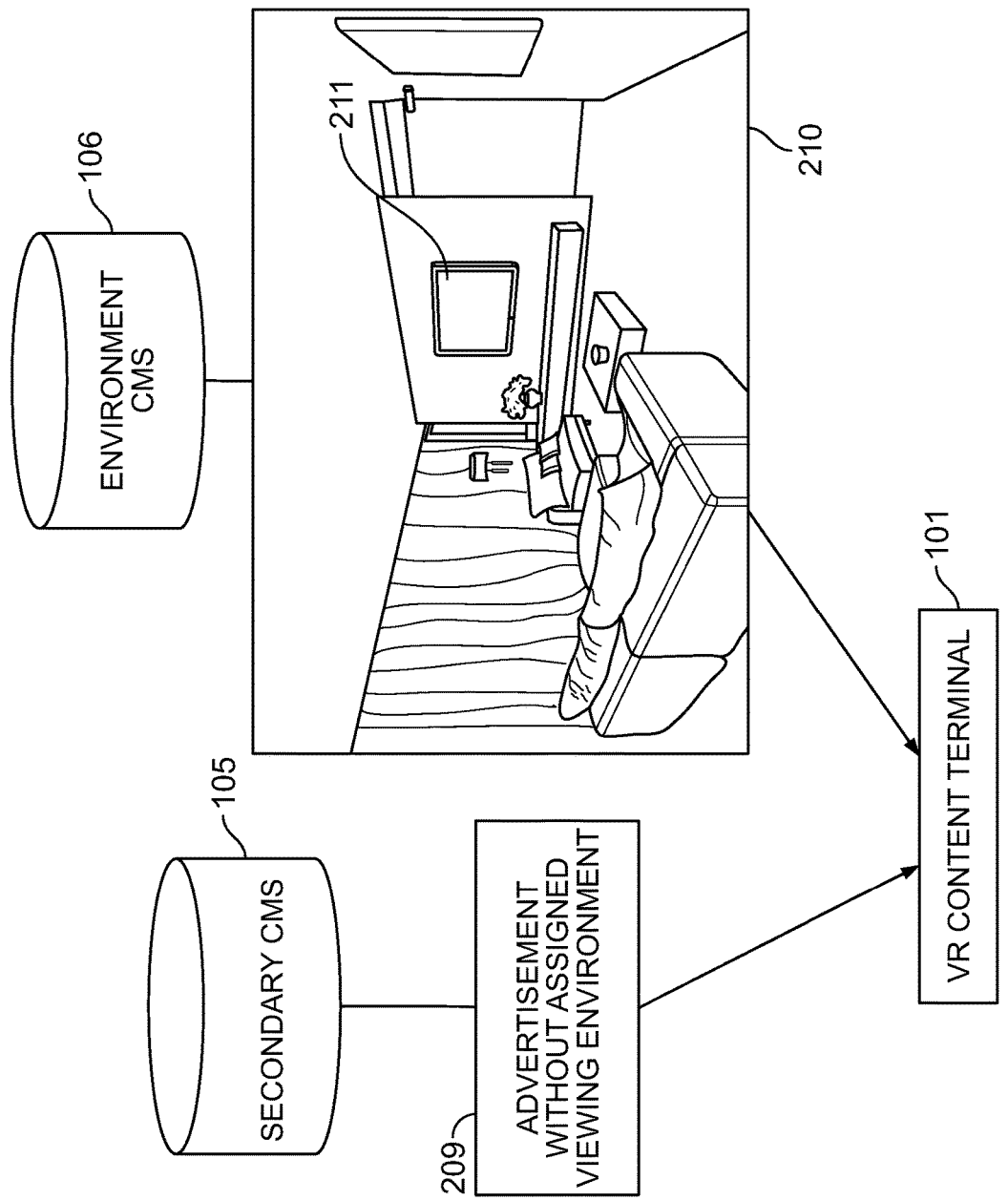

SYSTEM AND METHOD FOR PRESENTING CONTENT WITHIN VIRTUAL REALITY ENVIRONMENT

BACKGROUND

Virtual Reality (VR) content provides an enhanced viewing and interactive experience for a user by conveying the feeling of being immersed within an environment. Most VR systems enhance the experience by providing the user with the ability to change the user's viewpoint within the content or with respect to various elements of the content, and the environment, characters, and objects within the content may be presented to have a three-dimensional (3D) effect. Recent advancements in VR, including smartphone based VR solutions, have increased the potential of VR implementations that are readily available to a large audience of consumers.

As the VR environment is fully immersive, it is important to present all aspects of the environment in the same perspective or 3D effect in order to maintain the user's perception of full immersion. When a user is observing a fully immersive environment, a difference in perspective for even one or a few objects may present a jarring experience for the user and the immersive illusion could be immediately destroyed. Therefore, all content presented in the VR environment must be rendered in the same perspective, which often requires content providers to perform full VR renderings of all content in order to reach a user in the VR presentation space.

For these reasons, it may be advantageous for content providers to be able to transition their existing 2D content to be presentable to users within the VR environment without creating a jarring experience for the user due to changes in user perspective, and without completely re-rendering the 2D content into a VR compatible format, which often requires substantial effort and cost. Thus, there is a great need for a solution to effectively present 2D content within a VR presentation environment while maintaining the VR immersion effect for a user.

SUMMARY

Embodiments of the present disclosure include a system and method for presenting 2D content within a VR presentation environment while maintaining the VR immersion effect for a user. In some embodiments, the 2D content corresponds to existing 2D content to be presented to a user within the three dimensional VR environment. In some embodiments, the 2D content corresponds to 2D advertising content to be displayed during a user's experience within a VR content presentation.

In some embodiments, during presentation of the VR content by a VR terminal, the VR terminal or an associated device may request and/or receive information of the 2D content from an external server. The external server may correspond to an advertisement server in some embodiments. The 2D content may be received, or information of the 2D content may be received, including link information of another source from which the 2D content is available.

In some embodiments, the external server may also provide metadata of the 2D content, including identifying metadata, content related metadata, and VR related metadata. The received metadata may include information on coordinates corresponding to the VR presentation environment, wherein the 2D content is to be displayed at the location corresponding to the coordinates. The metadata may also include information related to an additional or existing VR display environment for the 2D content within the VR presentation.

An embodiment of a method of the present disclosure includes providing the VR presentation to a user, receiving information of the 2D content for display during the VR presentation from an external source, obtaining coordinate information related to a display location within the VR presentation for displaying the 2D content, and displaying the 2D content at the display location based on the received information and the coordinate information, wherein the display location corresponds to a 2D display rendered within the VR presentation. In some embodiments, the display location may correspond to 2D displays that are rendered within the VR presentation environment, including television screens, movie theater screens, automobile screens, flat surfaces for viewing 2D content, and the like.

An embodiment of a system of the present disclosure may include a VR display, a receiver, and one or more controllers configured to cause the VR display to provide the VR presentation; receive, via the receiver, information of the 2D content for display during the VR presentation from an external source; obtain coordinate information related to a display location within the VR presentation for displaying the 2D content; and cause the VR display to display the 2D content at the display location based on the received information and the coordinate information, wherein the display location corresponds to a 2D display rendered within the VR presentation.

BRIEF DESCRIPTION OF THE DRAWINGS

The above and other aspects and features of the present disclosure will become more apparent upon consideration of the following description of embodiments, taken in conjunction with the accompanying drawing figures.

FIGS. 2A, 2B, and 2C are illustrations of an aspect of the system for providing secondary content and a virtual viewing environment according to various embodiments of the present disclosure.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for presenting 2D content within a VR content presentation or environment. The terms VR and VR content refer to virtual reality implementing three-dimensional content; however for the purposes of this disclosure the terms VR and VR content will also be considered as including all forms of audio and video content presentation providing an immersive simulated experience for a viewer, including 3D virtual reality content, 360 degree video, content presentation implemented with motion capture, and the like.

Figure 1:
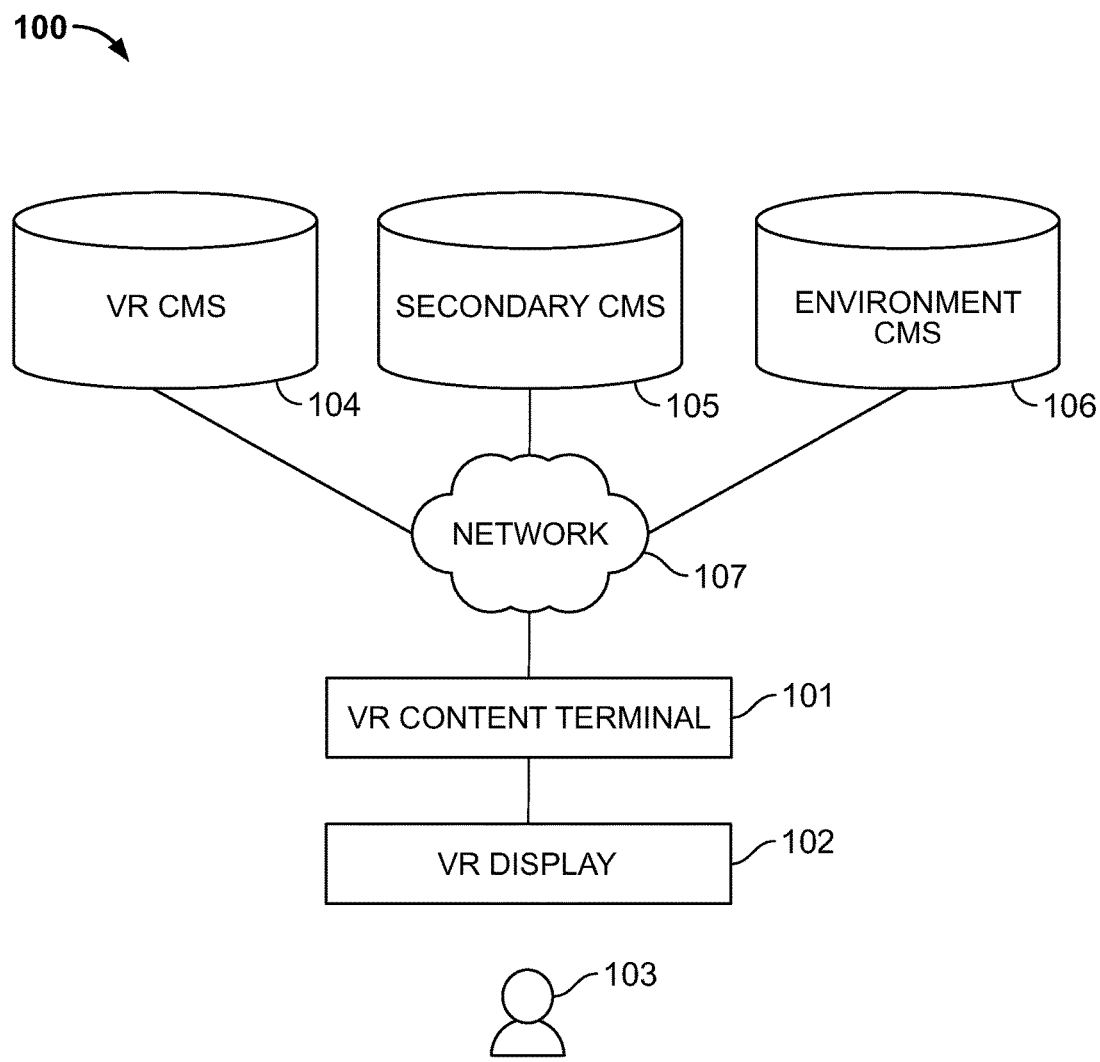
FIG. 1 is an illustration of a system for presenting content within a virtual reality environment in accordance with an embodiment of the present disclosure.

Referring now to FIG. 1, an embodiment of a system 100 for presenting content within a virtual reality (VR) environment is shown. The system includes a VR content device 101 configured to receive, display, or render VR content for a user 103. The VR content device 101 may be a computing device, comprising hardware and/or software, and may include or be implemented in conjunction with a VR display 102 to provide a VR experience for the user 103. In some embodiments, the VR content device 101 and the VR display 102 may be directly coupled or connected, and in other embodiments, the VR content device 101 and the VR display 102 may be remotely coupled or connected, or otherwise implemented to communicate remotely with each other, including wireless configurations or cloud computing implementations.

The VR content device 101 may be configured to output the rendered VR content to the VR display 102. In some embodiments, the VR content device 101 and the VR display 102 may be implemented in a single location, or they may be separately implemented in different locations and communicatively connected via a communication network, such as an internet protocol network implemented over cable, satellite, fiber, wireless networks, and the like. In some embodiments, the VR content device 101 may be provided in a cloud computing implementation, which provides VR content, programs, and instructions to a VR display 101 and related terminal via a network 107. The VR display 102 may include various types of displays and modules known in the art for implementation of VR systems.

For example, the VR display 102 may include a head mounted display, among other known configurations, to be worn on the head of user 103, providing a display a monocular or binocular display optic. The head mounted display may include speakers or headphones to provide surround sound audio to the user 103 corresponding to the visual VR content. Another embodiment may include one or more traditional displays, such as a television, arranged such that the user is provided with an immersive visualization experience. In other embodiments, the VR display 102 may include a multi-view, holographic, or other VR-type enabled display configured to provide an immersive content presentation configuration to the user. It will be understood by those of ordinary skill in the art that the VR content device 101 and VR display 102 may include and incorporate various other VR configurations and implementations known and practiced in the art, and the embodiments discussed herein are not to be limiting.

The VR content device 101 may be operably connected to a VR content management system (CMS) 104, a Secondary CMS 105, and an Environment CMS 106. The VR content device 101 may be directly coupled or connected to the various CMSs or may be operably connected to the various systems via a communication network 107. The network 107 may include various communication hardware and protocols, including local and wide area networks, intranets, wired or wireless connections, satellite communications, and the like. It will be understood by those of ordinary skill in the art that the various components and aspects of the system 100 may be implemented in different configurations and arrangements, including cloud computing implementations, which contemplate receiving, transmitting, and otherwise communicating data, content, instructions, and the like, between one or more, or all, of the components of the system 100 via a network 107.

The VR CMS 104 may be configured to store, retrieve, and provide various VR, 3D, and 360-degree-viewing enabled content to a content player, including the VR content device 101. The VR CMS 104 may include a database, and may further include other hardware and software to implement the VR CMS 104, including server terminals, remote terminals, network hardware, and the like. The content stored in the VR CMS 104 may include fully rendered VR or 3D content provided by content providers along with metadata information of each content item. For example, a content provider may store a full length movie rendered for presentation in a VR environment along with metadata including information on the content title, actors, genre, time length, subtitles, and the like.

The stored metadata may also include information on insertion points for secondary content, for example, advertisements, supplemental content, etc. The stored metadata thus may include insertion information for advertisements, such as when an advertisement content needs to be retrieved and displayed, for example, information for insertion of a pre-roll advertisement which displays the advertisement content prior to the VR content, a mid-roll advertisement which displays the advertisement during the VR content, and the like. The metadata information may also include advertisement insertion logic to determine a type, category, length, or specific advertisement content to insert in various corresponding insertion points.

The VR content device 101 may send a request to the VR CMS 104 to provide VR content as selected by the user 103. In some embodiments, the VR content device 101 may provide a graphic user interface (GUI) for display to the user via the VR Display 102 for browsing, searching, and selecting various VR content available for presentation, and provided by the VR CMS 104, or another external content providing source. Information related to the available VR content displayed by the VR Display 102 may be received using known protocols and standards such as Media RSS (MRSS), and the like. When requested by the VR content device 101, the VR CMS 104 may identify, retrieve, and provide the VR content to the VR content device 101 for display to the user. When the VR content is loaded, the metadata related to the VR content may also be loaded, including the content insertion information or logic.

For example, the VR content device 101 may load information on advertisement insertion within the VR content to be presented, and during the presentation of the VR content, the VR content device 101 may identify, obtain, and present secondary content such as supplemental content or advertising in conjunction with the primary VR content. Various implementations including hardware and software for distributing and presenting content with secondary content and advertisement insertion are well known and used in the related art, and can be used to implement various aspects of this disclosure.

The Secondary CMS 105 may be configured to store, retrieve, and provide various secondary content to a content player, including the VR content device 101. The Secondary CMS 105 may include a database, and may further include other hardware and software to implement the Secondary CMS 105, including server terminals, remote terminals, network hardware, and the like. In some embodiments, the secondary content may include advertising content to be inserted into VR content presentations. In preferred embodiments, the secondary content may include traditional 2D advertising content, for example advertisements traditionally displayed in conjunction with traditional television, internet video, or movie presentations.

The content stored in the Secondary CMS 105 may include secondary media or content to be inserted into VR content presentations, or location information where the secondary media or content may be retrieved. For example, the stored information in the Secondary CMS may include link information for an advertisement in an XML or other format which may be used by the VR content device 101 to locate and retrieve the corresponding secondary content file for display.

A secondary content provider such as an advertisement distributor or advertisement campaign manager may provide, e.g., to the secondary CMS 105, secondary content, or information of the secondary content such as a link, along with metadata of the secondary content, including a category of the content, identifier of a source of the content, intended viewing market of the secondary content, and the like. The stored metadata may also include information on an assigned or preferred virtual viewing environment intended for the secondary content. For example, where the secondary content corresponds to an advertisement, the advertisement provider may store metadata information indicating a virtual viewing environment in which the advertisement is to be viewed by a user.

Accordingly, the system 100 may further include an Environment CMS 106 configured to store, retrieve, and provide various viewing environment data to a content player, including to the VR content device 101. The Environment CMS 105 may include a database and may further include other hardware and software to implement the Environment CMS 105, including server terminals, remote terminals, network hardware, and the like. In some embodiments, the environment content stored in the Environment CMS 105 may include rendered virtual viewing environments, or information linking to said rendered virtual viewing environments, in which the secondary content is to be presented.

For example, the stored information in the Environment CMS may include rendered VR environments which include 2D display surfaces on which the 2D secondary content is to be displayed to a user while maintaining the VR experience. The stored environment information may be provided to the Environment CMS 105 by the secondary content provider in conjunction with the secondary content stored in the Secondary CMS 104 associated with each viewing environment.

The virtual viewing environment may be specific to the content of the advertisement, or may be based on a category or genre of the advertisement content. In some preferred embodiments, the virtual viewing environment includes a rendered 2D viewing surface for presentation of the 2D advertisement content within the VR context, such that the user's VR immersion experience is not affected. For example, the rendered 2D viewing surface may correspond to displays such as television screens, movie screens, projection screens, billboards, mobile phone screens, tablet computer screens, and the like, which are rendered and presented within the VR environment. For example, a user may be placed inside a virtual house within a VR environment, and various 2D viewing surfaces may be available for presenting 2D advertisement or supplemental content to the user, such as the television screen in the house or a computer screen in the house. A 2D viewing surface may not be limited to displays depicted within the VR environment, and may also correspond to surfaces on which 2D content may be displayed to the user within the VR environment, including flat walls, buildings, windows, mirrors, other continuous surfaces, and the like.

In addition to metadata indicating a virtual viewing environment, the stored metadata may further include coordinate information indicating a set of coordinates within the virtual viewing environment which corresponds to the 2D viewing surface where the 2D content is to be displayed. For example, the stored metadata may include coordinate information, such as world coordinates, defining a boundary of the 2D viewing surface within the VR environment using four sets of coordinates—each having values for an x-axis, a y-axis, and a z-axis—to define the corners of a rectangular display location corresponding to a screen. Other embodiments may include less location information or more coordinate values to accurately define a 2D viewing surface boundary or define an irregularly shaped 2D viewing surface. In other embodiments a single coordinate set may be provided and a boundary of the 2D viewing surface may be defined relative to the single coordinate set location. For the purposes of this discussion, the embodiments disclosed herein will be described as including coordinate information indicating a set of coordinates within the virtual viewing environment, however it will be understood by those of ordinary skill in the art that this disclosure contemplates other information capable of identifying a location within the virtual viewing environment, including vector information, matrices, and the like.

In some embodiments, the VR content device 101 may be configured to utilize a display location for a 2D viewing surface within the VR environment originally being shown to the user (referred to as the "existing VR environment"). In such embodiments, metadata of the secondary content or related information received from the secondary CMS 105 may include information related to requirements for a 2D viewing surface for the secondary content. This metadata may include specifications indicating a desired or suitable type of 2D viewing surface (i.e., television, movie theater screen, smartphone, and the like), or characteristics of a suitable 2D viewing surface, such as size, shape, aspect ratio, perceived distance or angle from the user within the existing VR environment, brightness, and the like.

The metadata may be utilized to perform a search for candidate 2D surfaces within the existing VR environment which may be suitable for displaying the secondary content to the user. If one or more candidate 2D surfaces are identified, the 2D surface most closely matching the specification information may be selected as the 2D viewing surface by displaying the secondary content on the identified 2D viewing surface. In some embodiments, if no candidate 2D surfaces are identified within the existing VR environment, the VR content device 101 may be configured to query the environment CMS 106 for a virtual viewing environment for presenting the secondary content, as will be discussed in greater detail.

Figure 2A:
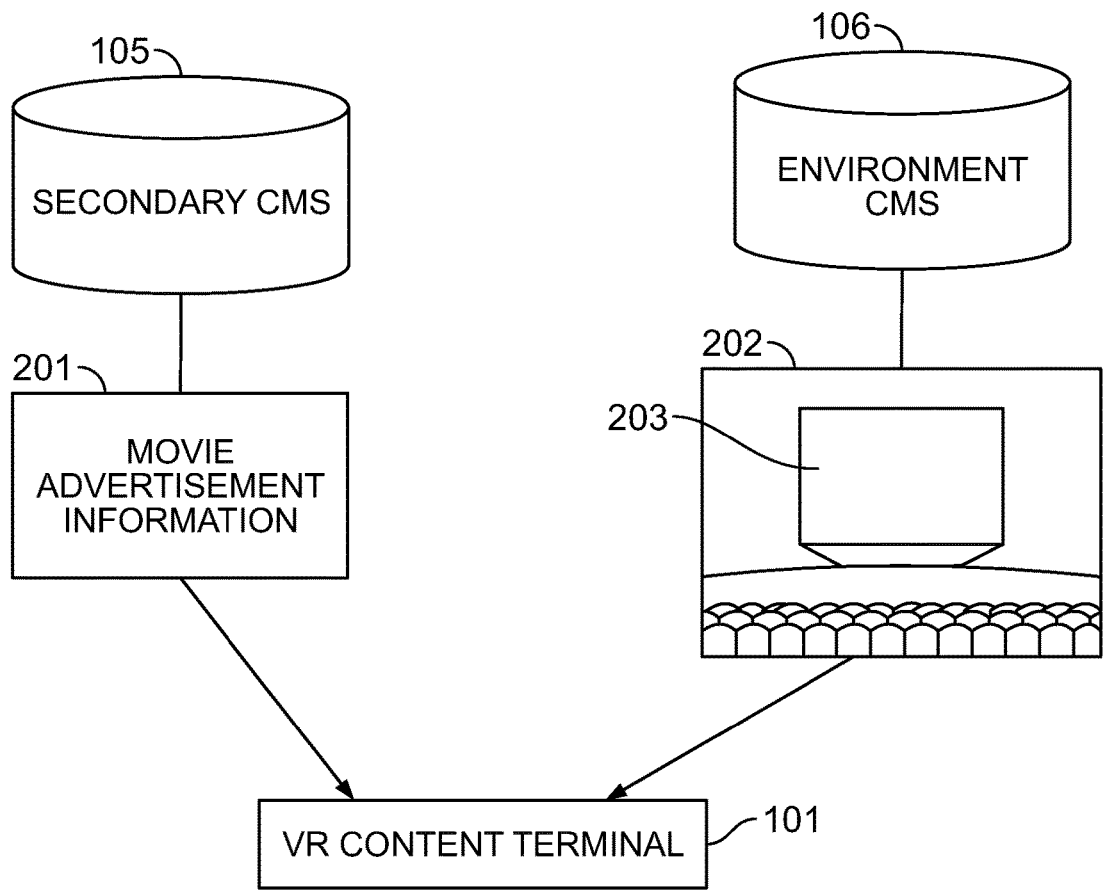

An example of an embodiment is shown in FIG. 2A, where the advertisement content—referred to as movie advertisement information 201—stored in the Secondary CMS 105 corresponds to an advertisement of an upcoming movie release. The assigned virtual viewing environment may correspond to a VR movie theater environment 202 stored in the Environment CMS 106 for presentation to the user. In some embodiments, the Environment CMS 106 may store link or data information, such as XML, which indicates a location from which the virtual viewing environment is available. The VR content device 101 may be configured to receive the movie advertisement information 201 (or corresponding link information) and the information associated with VR movie theater environment 202 (or corresponding link information) to package or render a complete VR presentation to the user in which the user experiences a VR effect of being present in the movie theater while the 2D advertisement is being played on a virtual movie theater screen 203.

The VR movie theater environment 202 may be presented to the user to replace any VR environment originally being shown to the user (the "existing VR environment") or may be inserted or otherwise introduced into the existing VR environment to preserve continuity of the user's VR experience. In some embodiments, the existing VR environment may be gradually removed and the VR movie theater environment 202 may be gradually presented to the user to provide a gradual transition, or in other embodiments the user may be provided with an instruction or request within the existing VR environment to proceed to or enter a location which corresponds to the VR movie theater environment to further provide continuity of the user's VR experience.

The VR content device 101 may also utilize metadata received from the Environment CMS 106 which includes coordinate information indicating the location of the movie screen 203 within the VR movie theater environment 202 such that the VR content device 101 may render the VR environment and insert the 2D secondary content 201 to appear to be displayed on the virtual movie theater screen 203. In this way, the 2D advertisement content may be presented to the user while maintaining the user's immersive VR experience.

Figure 2B:
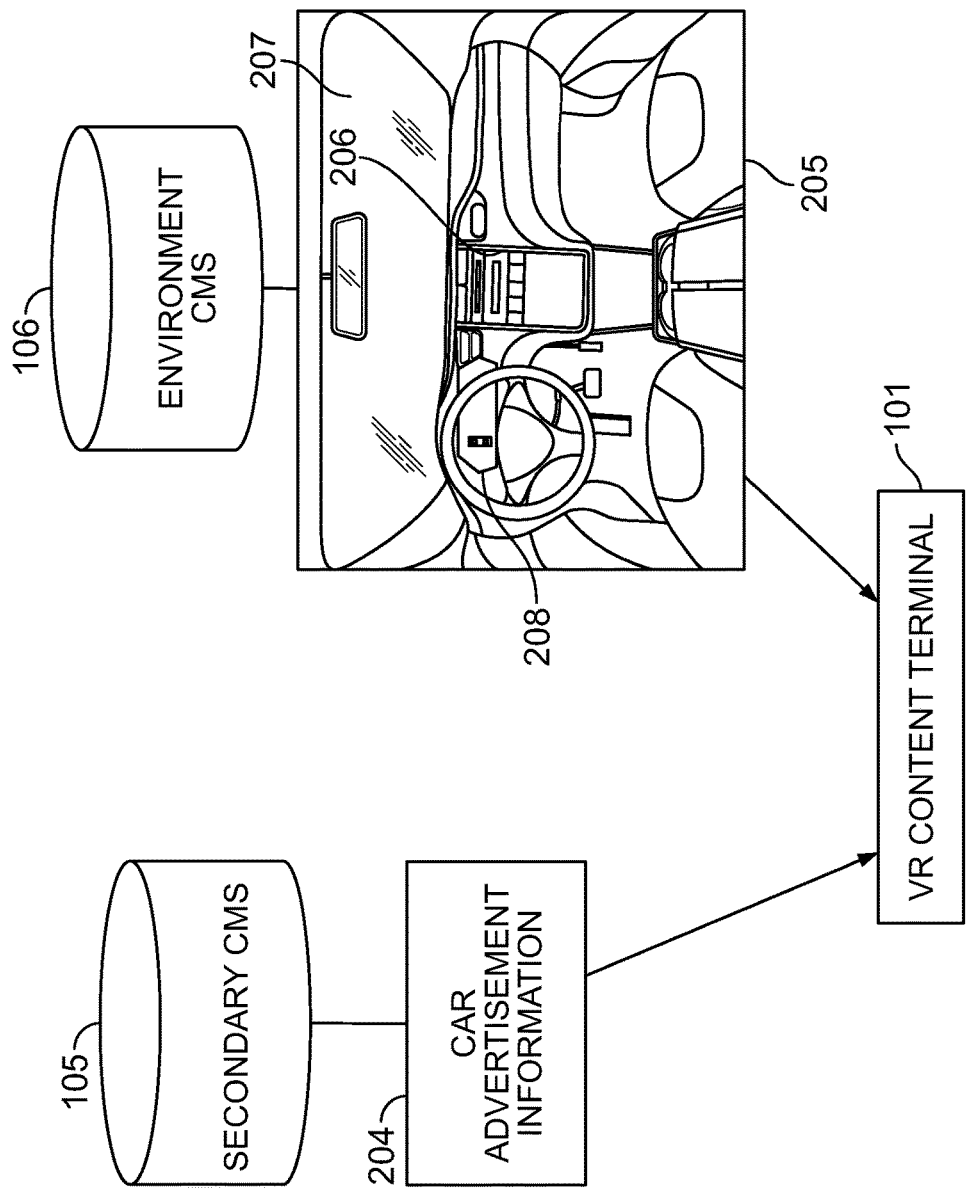

In another example referring to FIG. 2B, where the stored advertisement information corresponds to an advertisement for an automobile 204, the 2D advertisement 204 may be assigned with a virtual viewing environment of an interior of the automobile 205, with the 2D advertisement content displayed on the windshield 207, dashboard 208, navigation unit 206, or other display or surface of the automobile viewing environment 205. In yet another example, not depicted, where the stored advertisement information corresponds to an advertisement of a mobile phone, the assigned viewing environment may be a showroom of the mobile phone manufacturer and the display location of the 2D advertisement may correspond to a screen of the mobile phone held by the user, a screen of a tablet computer, or the like.

As discussed above, the virtual viewing environment may replace an existing VR environment completely, or the virtual viewing environment may be inserted or otherwise introduced within the existing VR environment. By way of example, where the virtual viewing environment corresponds to the interior of the automobile 205, in one embodiment the user may be presented with an automobile which stops near the user and the user is provided with instructions or a request to enter the automobile, wherein the user is presented with the virtual viewing environment as discussed above.

In other embodiments, the virtual viewing environment may entirely replace the existing VR environment, such as the existing VR environment fading to black, and the virtual viewing environment gradually fading in to provide a gradual transition between environments. In embodiments wherein the virtual viewing environments are inserted within the existing VR environment, coordinate or other location information to place the virtual viewing environment within the existing VR environment may be provided by the Environment CMS 106, and utilized by the VR content device 101 to accurately render and present the virtual viewing environment. After presentation of the 2D advertisement or supplemental content, the user may be returned to the existing VR environment where the user was previously situated.

In some embodiments, generic viewing environments applicable to various types of secondary content may be stored in the Environment CMS 106, wherein each generic viewing environment is associated with a particular category or genre of secondary content. In such embodiments, where secondary content is not associated with a specific viewing environment, the category or genre metadata of the secondary content may be used to determine a generic viewing environment which most closely matches a desired viewing environment in which the user is to view the secondary content.

For example, referring to FIG. 2C, a generic viewing environment stored in the Environment CMS 106 may include a VR rendered luxury living room environment 210, and the display location may correspond to a large flat screen television 211 within the living room. The secondary content 209 may be an advertisement for high end luxury watches stored in the Secondary CMS 105 and the secondary content 209 may have no associated viewing environment indicated in the metadata. In this case, the VR content device 101 may obtain a category value from metadata of the secondary content which indicates that the secondary content belongs to the category of "luxury goods." Using this category value information, the VR content device 101 may query the Environment CMS 106 for a generic viewing environment corresponding to the category "luxury goods," and may receive VR environment information including the rendered VR luxury living room 210.

In another example, the category value from metadata of the secondary content may indicate that the secondary content belongs to the category of "cosmetics." Using this category value information, the VR content device 101 may query the Environment CMS 106 for a generic viewing environment corresponding to the category "cosmetics," and may receive VR environment information including a VR rendered department store, wherein a 2D viewing surface is presented on a mirror presented in front of the user. A generic viewing environment may also correspond to multiple categories, thus for example the VR rendered department store may also correspond to the categories of "fashion," "clothing," or "shopping."

Other examples of generic environments associated with categories of the secondary content may include: a VR rendered sports arena for the categories of "sports" and "events" wherein a 2D viewing surface is presented on an arena screen or "Jumbotron"; a VR rendered restaurant setting for the categories of "dining" and "wine"; and a VR rendered hotel lobby setting for the categories of "travel" and "business." It is considered in other embodiments that the generic viewing environments may be associated with various points of metadata other than a category, such as date, intended demographic, or characteristics of the content itself such as characters, actors, or levels of colors, sounds, or movement depicted within the content, and the like.

In other embodiments, a generic VR environment information may be used for displaying 2D secondary content with no metadata indicating a specific viewing environment or category of viewing environment. The generic VR environment may thus provide a default viewing environment appropriate for all types of 2D content, such as a generic living room, a smartphone screen, a laptop computer screen, or the like. Thus, various levels of VR environment information may be stored in the Environment CMS 106 and provided based on the metadata of the secondary content 209, including where the metadata is not available at all.

The generic VR environment information received from the Environment CMS 106 may also include metadata indicating the coordinates within the environment for displaying the 2D advertisement on the 2D surface of the television screen 211. The coordinates may include x-axis, y-axis, and z-axis values expressed as vectors, matrices, or the like within the VR environment to indicate a display location of the 2D secondary content. In the example discussed above, the coordinates correspond to the location of the boundaries of the television screen within the VR rendered luxury living room. The VR content device 101 may be configured to receive the coordinate information, identify the display location within the VR environment, and package or render the 2D secondary content at the specified location within the VR environment.

Referring back to FIG. 1, the VR content device 101 is configured to receive the primary VR content from the VR CMS 104 and render the VR content presentation for display to the user by the VR display 102. The VR content device 101 may also receive metadata of the VR content from the VR CMS 104, as discussed above, which may include secondary content insertion logic to indicate when, where, and how secondary content is to be displayed to the user during the VR content presentation. Based on the secondary content insertion logic, the VR content device 101 may receive secondary content information, such as an advertisement or link information for retrieving said advertisement, from the Secondary CMS 105. The Secondary CMS 105 may further provide metadata of the secondary content to the VR content device 101, wherein the metadata includes information about an associated virtual viewing environment for the secondary content. In some embodiments, the metadata may not include information of an associated virtual viewing environment, and may only include metadata of the content of the secondary content. In yet another embodiment, no metadata for the secondary content may be received by the VR content device 101.

Since the virtual viewing environments include a rendered 2D surface which the user perceives and understands is meant to display 2D media within the VR space (such as a virtual movie screen or virtual television display), displaying the 2D content within the virtual viewing environment is perceived by the user as appearing natural and congruent with the remainder of the VR context. In this manner, the VR content device 101 may cause the VR display 102 to present a VR content presentation to the user 103, and additionally present traditional 2D secondary content interspersed within the VR content presentation without interfering with the user's immersive VR experience.

The VR content device 101 may further be configured to customize a virtual viewing environment based on the secondary content, or other related information. In some embodiments, the Environment CMS 106 may store a customizable virtual viewing environment (or a link thereto), which is configured to be further customized using content related to an associated secondary content. For example, referring to FIG. 3, the VR content device 101 may receive information of secondary content 301 from the Secondary CMS 105 as previously discussed, and metadata may also be received indicating an assigned virtual viewing environment for the secondary content 301. In some embodiments, the assigned virtual viewing environment 302 may be configured to be further customized based on the secondary content 301.

The customizable viewing environment 302 may include predefined customizing portions 304, 305, 306 within the rendered VR environment which are to be rendered using additional media or information related to the secondary content. For example, where the secondary content 301 corresponds to a movie trailer advertisement for a movie titled "Despicable Me," the customizing portions 304, 305, 306 may be rendered to display the title of the movie, posters or images related to the movie, characters from the movie, and the like. Accordingly, the VR content device 101 may receive additional metadata information along with the secondary content from the Secondary CMS 105 which provides videos, images, or other media for use in rendering the customized content for display on the customizing portions 304, 305, 306. The received metadata may further include coordinate information, or other location identifying information, for each item of media to indicate a location within the virtual viewing environment 302 on which to render each media item. In this manner, a secondary content provider may generate customized virtual viewing environments tailored specifically to a large number of secondary content items without generating a specific viewing environment for every single item.

Figure 3:
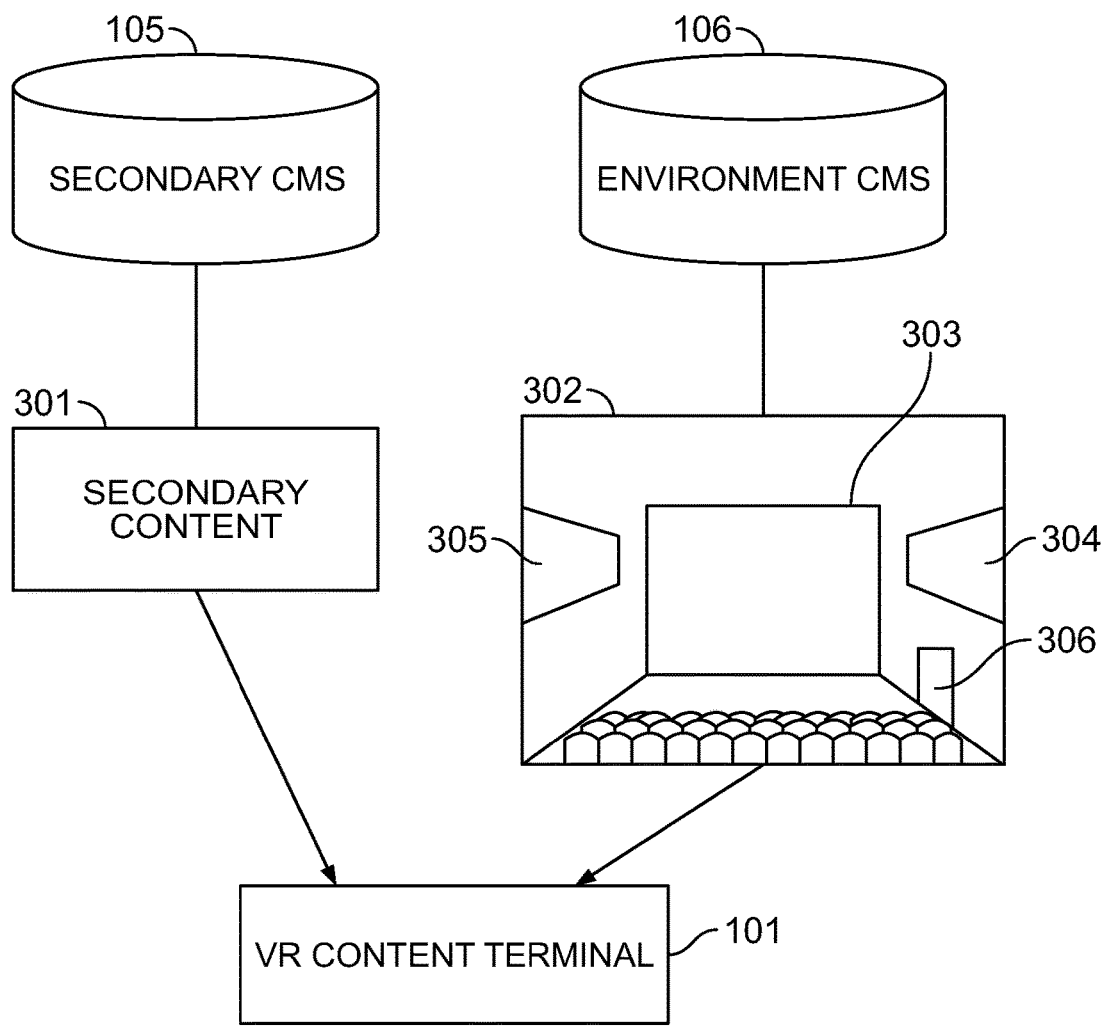
FIG. 3 is an illustration of an aspect of the system for providing secondary content and a customized virtual viewing environment according to an embodiment of the present disclosure.

Although FIG. 3 displays the customizable portions 304, 305, 306 as poster or banner type display areas, the current disclosure is not limited to such configurations. In some embodiments, various aspects of the virtual viewing environment may be changed and rendered by the VR content device 101 based on metadata of the secondary content received from the Secondary CMS 105, such as colors of objects, size and position of objects within the viewing environment, lighting conditions, lighting color, and the like.

For example, in the car advertisement viewing environment discussed above, the metadata received from the Secondary CMS 105 may indicate that the 2D car advertisement to be displayed takes place in a nighttime setting. Accordingly, the VR content device 101 may render the external virtual viewing environment of the car to look out into a nighttime setting in order for the user to feel a connection to the secondary content being displayed on the virtual dashboard or navigation unit. Various other aspects of the virtual viewing environment may be altered and customized by the VR content device when rendering the environment according to the received metadata.

In some embodiments, the VR content device 101 may be configured to additionally render or otherwise present VR objects which are not included in the virtual viewing environment received from the Environment CMS 106. The VR content device 101 may perform analysis on the media of the secondary content to extract content to be VR rendered for insertion into the virtual viewing environment.

For example, in the virtual viewing environment discussed above corresponding to the luxury living room, where the secondary content corresponds to an advertisement for a luxury watch, the VR content device 101 may extract various 2D images from the secondary content in order to render a VR-enabled representation of the watch for insertion into the virtual viewing environment. Thus, while the user is immersed in the living room viewing environment watching the 2D secondary content on the virtual television display, the VR content device 101 may render or otherwise present a VR-enabled representation of the watch to appear on the coffee table in the living room in front of the user. In other examples, the VR content device 101 may render or otherwise present other new VR aspects into the virtual viewing environment, including people, animals, characters, vehicles, environmental aspects, and the like which may be relevant to the secondary content.

This may be performed by performing object recognition and extracting numerous images of the specific object (e.g., the watch) from the 2D video comprising the secondary content in order to compile and render full 360 degree information including top/down views of the object to render a VR-enabled representation of the object. In such embodiments, the system 100 may further include additional components, including a content analyzer, one or more databases storing image information of known 2D objects, one or more databases storing information of rendered VR objects, and a VR synthesizer configured to compile all relevant information of the object to create a VR object. As the various methods and hardware for implementing these VR rendering techniques are included in other filed disclosures by this Applicant, detailed discussion will not be included herein.

In this manner, the VR content device 101 may customize the virtual viewing environment for the secondary content, and may further enhance the user's VR immersion experience by generating new VR content inserted into the viewing environment based information extracted from the secondary content.

Figure 4:
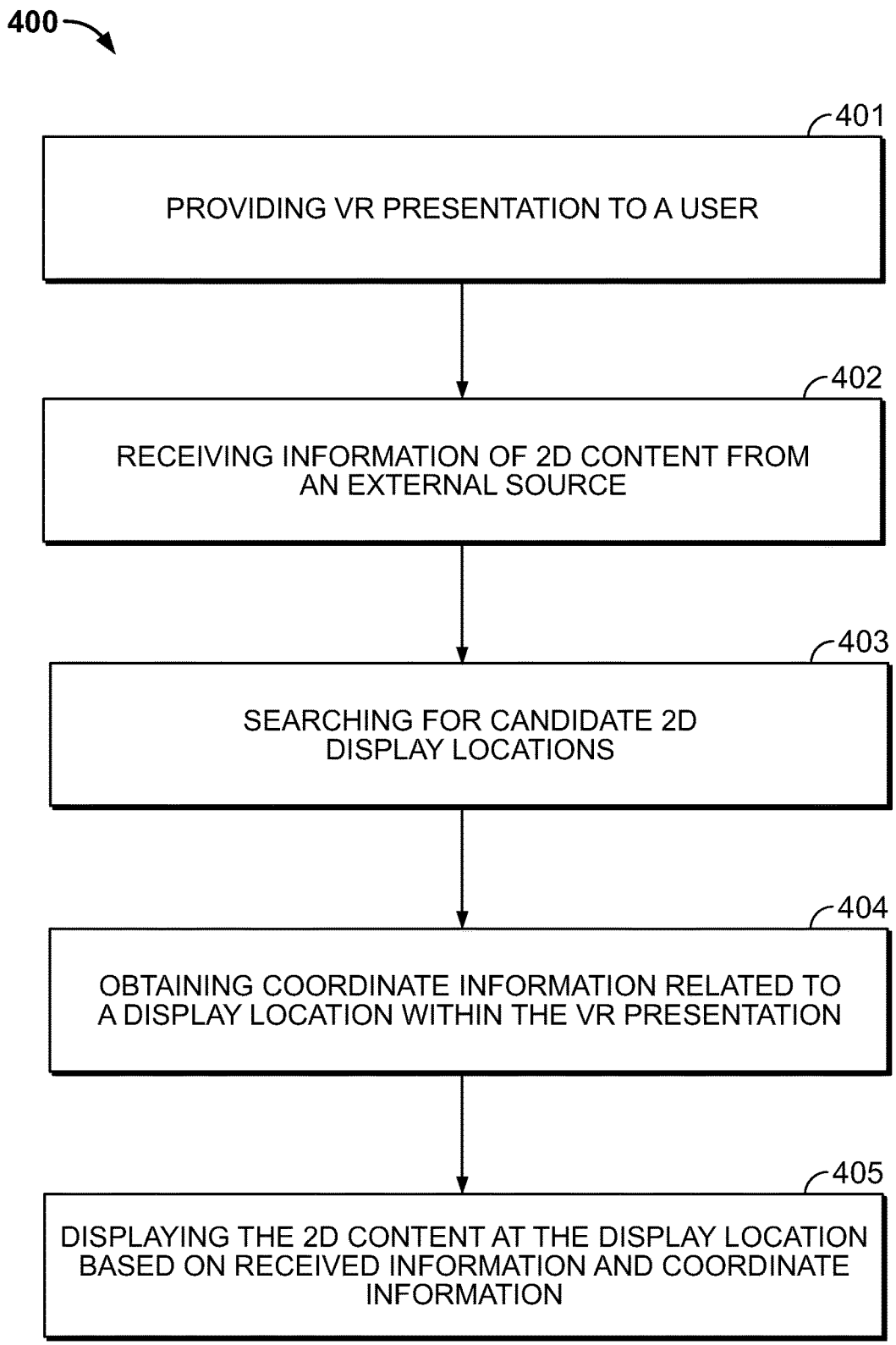
FIG. 4 is an illustration of a method for presenting content within a virtual reality presentation in accordance with an embodiment of the present disclosure.

Referring now to FIG. 4, the figure shows a flowchart including operations of an embodiment of a method 400 for presenting 2D content within a VR presentation. In one embodiment, the method 400 may include providing the VR presentation to a user at block 401; receiving information of the 2D content for display during the VR presentation from an external source at block 402; and searching for candidate 2D display locations within the VR presentation at block 403. The method further includes obtaining coordinate information related to a display location within the VR presentation for displaying the 2D content at block 404, where the coordinate information may be obtained as a result of the search for candidate 2D display locations. In other embodiments, the search for candidate 2D display locations may be optional, and a 2D display location may be pre-assigned or otherwise determined within the VR presentation. The method further includes displaying the 2D content at the display location based on the received information and the coordinate information shown at block 405. The display location may correspond to a 2D display rendered within the VR presentation, as discussed with respect to previous embodiments.

Figure 5:
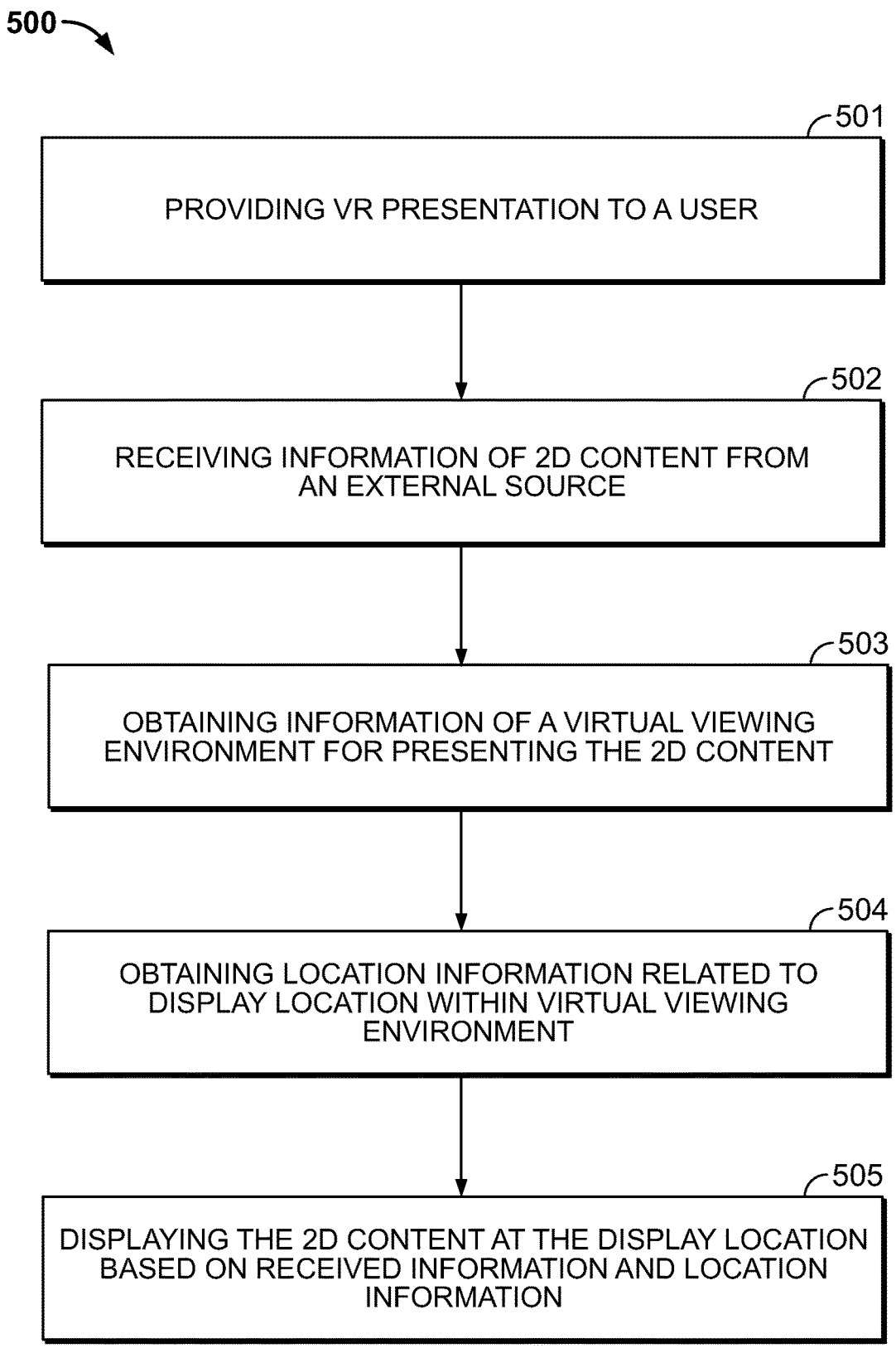
FIG. 5 is an illustration of a method for presenting content with a virtual viewing environment in accordance with another embodiment of the present disclosure.

FIG. 5 shows a flowchart including operations of another embodiment of a method 500 for presenting 2D content within a VR presentation. In the embodiment, the method 500 may include providing a VR presentation to a user at block 501, receiving information of 2D content from an external source at block 502; and obtaining information of a virtual viewing environment for presenting the 2D content at block 503. The method further includes obtaining location information related to a display location within the virtual viewing environment for displaying the 2D content shown at block 504 and displaying the 2D content at the display location based on the received information and the location information at block 505, wherein the display location corresponds to a 2D display rendered within the virtual viewing environment. In the embodiment, the virtual viewing environment may be different than the environment that the user is currently viewing ("existing VR environment"), and the virtual viewing environment may entirely replace the existing VR environment or the existing VR environment may be transitioned to the virtual viewing environment, as discussed.

Various embodiments of the VR content device 101 may further comprise additional aspects which have been omitted for the purposes of the discussion of FIG. 1, and it will be understood by those of ordinary skill in the art that all combinations of aspects of the system are considered including a VR renderer, VR analyzer, VR synthesizer, and the like. Additionally, it will be understood that this disclosure considers embodiments of various aspects a system for generating VR content wherein the system includes all of the components depicted and discussed herein, including a system having hardware or software components implemented together, or separated and connected by known networking and communication methods and techniques.

As previously discussed, in some embodiments the VR content device may comprise one or more software or hardware computer systems and may further comprise or be operably coupled to one or more hardware memory systems for storing information including databases for storing, accessing, and querying various content and characteristics information. In hardware implementations, the one or more computer systems incorporate one or more computer processors and controllers.

The components of the various embodiments discussed herein may each comprise a hardware processor of the one or more computer systems, and in one embodiment a single processor may be configured to implement the various components. For example, in one embodiment, the Secondary CMS and the Environment CMS may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system 100 may be operably coupled to communicate information, and the system may further include various hardware and software communication modules, interfaces, and circuitry to enable wired or wireless communication of information.

According to embodiments of the present invention, a system for presenting content within a virtual reality environment may include one or more computer systems, computer processors, storage devices, distribution channels, etc., in order to provide a VR presentation, identify, obtain, and provide 2D secondary content within the VR presentation, and identify, obtain, render, and provide a virtual viewing environment for the 2D secondary content within the VR presentation. Portions of the VR presentation, secondary content, virtual viewing environment information, metadata information, and VR and non-VR content for generating VR content may reside in different locations, or may be distributed widely and coordinated with one another across communication networks, particularly in a large organization. Moreover, particular portions may reside in entirely separate environments, such as content creators, content distributors, and the like.

Figure 6:
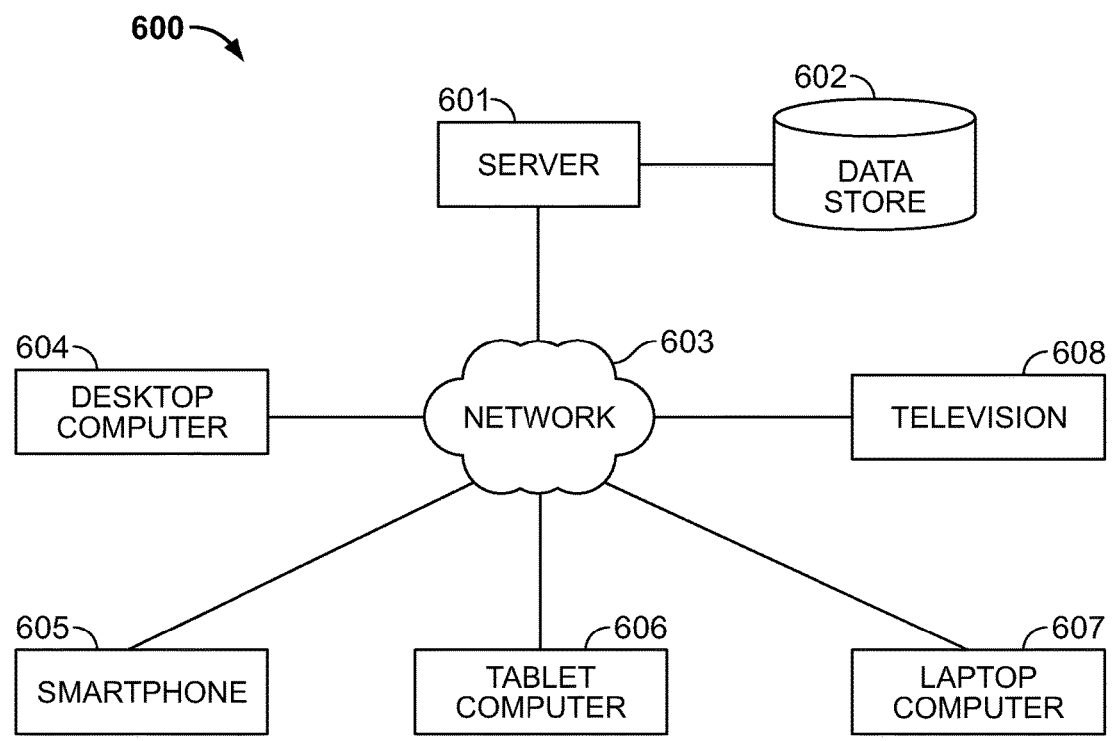
FIG. 6 is an illustration of a computing environment in accordance with an embodiment of the present disclosure.

In selected embodiments, the features and aspects disclosed herein may be implemented within a computing environment 600 shown in FIG. 6, which may include one or more computer servers 601. A server 601 may be operatively coupled to one or more data stores 602 (e.g., databases, indexes, files, or other data structures). A server 601 may connect to a data communication network 603 comprising a local area network (LAN), a wide area network (WAN) (e.g., the Internet), a telephone network, a satellite or wireless communication network, or some combination of these or similar networks.

One or more client devices 604, 605, 606, 607, 608 may be in communication with the server 601, and a corresponding data store 602 via the data communication network 603. Such client devices 604, 605, 606, 607, 608 may include, for example, one or more laptop computers 607, desktop computers 604, smartphones and mobile phones 605, tablet computers 606, televisions 608, or combinations thereof. In operation, such client devices 604, 605, 606, 607, 608 may send and receive data or instructions from or to the server 601, in response to user input received from user input devices or other input. In response, the server 601 may serve data from the data store 602, alter data within the data store 602, add data to the data store 602, or the like or combinations thereof.

In selected embodiments, the server 601 may stream or transmit one or more video files including video content, audio content, and/or metadata from the data store 602 to one or more of the client devices 604, 605, 606, 607, 608 via the data communication network 603. The devices may output video content from the video file using a display screen, projector, or other video output device. For example, the video file may comprise a clip of a movie, television show, live programming, news broadcast, or portion thereof for output using a display device of one or more of the client devices. In certain embodiments, the system 600 configured in accordance with the features and aspects disclosed herein may be configured to operate within or support a cloud computing environment. For example, a portion of, or all of, the data store 602 and server 601 may reside in a cloud server.

Figure 7:
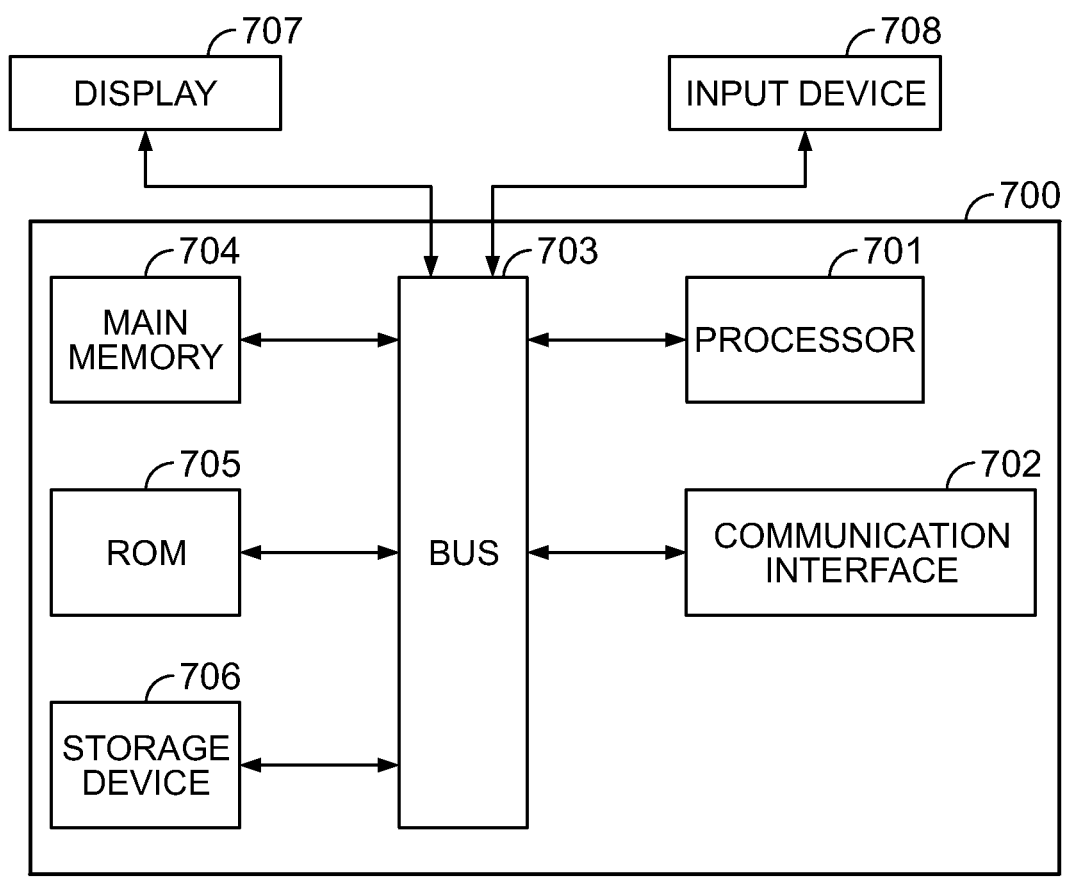
FIG. 7 is an illustration of a device in accordance with an embodiment of the present disclosure.

Referring to FIG. 7, an illustration of an example computer 700 is provided. One or more of the devices 604, 605, 606, 607, 608 of the system 600 may be configured as or include such a computer 700. In selected embodiments, the computer 700 may include a bus 703 (or multiple buses) or other communication mechanism, a processor 701, main memory 704, read only memory (ROM) 705, one or more additional storage devices 706, a communication interface 702, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 703 or other communication mechanism, including multiple such buses or mechanisms, may support communication of information within the computer 700. A processor 701 may be connected to a bus 703 and process information. In selected embodiments, a processor 701 may be a specialized or dedicated microprocessor configured to perform particular tasks in accordance with the features and aspects disclosed herein by executing machine-readable software code defining the particular tasks. Main memory 704 (e.g., random access memory—or RAM—or other dynamic storage device) may be connected to a bus 703 and store information and instructions to be executed by a processor 701. Main memory 704 may also store temporary variables or other intermediate information during execution of such instructions.

Read only memory 705 (ROM) or some other static storage device may be connected to a bus 703 and store static information and instructions for a processor 701. An additional storage device 706 (e.g., a magnetic disk, optical disk, memory card, or the like) may be connected to a bus 703. The main memory 704, ROM 705, and the additional storage device 706 may include a non-transitory computer-readable medium holding information, instructions, or some combination thereof, for example instructions that when executed by the processor 701, cause the computer 700 to perform one or more operations of a method as described herein. A communication interface 702 may also be connected to a bus 703. A communication interface 702 may provide or support two-way data communication between a computer 700 and one or more external devices (e.g., other devices contained within the computing environment).

In selected embodiments, a computer 700 may be connected (e.g., via a bus) to a display 707. A display 707 may use any suitable mechanism to communicate information to a user of a computer 700. For example, a display 707 may include or utilize a liquid crystal display (LCD), light emitting diode (LED) display, projector, or other display device to present information to a user of the computer 700 in a visual display. One or more input devices 708 (e.g., an alphanumeric keyboard, mouse, microphone) may be connected to a bus 703 to communicate information and commands to a computer 700. In selected embodiments, one input device 708 may provide or support control over the positioning of a cursor to allow for selection and execution of various objects, files, programs, and the like provided by the computer 700 and displayed by a display 707.

The computer 700 may be used to transmit, receive, decode, display, or the like one or more video files. In selected embodiments, such transmitting, receiving, decoding, and displaying may be in response to a processor 701 executing one or more sequences of one or more instructions contained in main memory 704. Such instructions may be read into main memory 704 from another non-transitory computer-readable medium (e.g., a storage device).

Execution of sequences of instructions contained in main memory 704 may cause a processor 701 to perform one or more of the procedures or steps described herein. In selected embodiments, one or more processors in a multi-processing arrangement may also be employed to execute sequences of instructions contained in main memory 704. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by a processor 701, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 702 may provide or support external, two-way data communication to or via a network link. For example, a communication interface 702 may be a wireless network interface controller or a cellular radio providing a data communication network connection. Alternatively, a communication interface 702 may comprise a local area network (LAN) card providing a data communication connection to a compatible LAN. In any such embodiment, a communication interface 702 may send and receive electrical, electromagnetic, or optical signals conveying information.

A network link may provide data communication through one or more networks to other data devices (e.g., client devices as shown in the computing environment 600). For example, a network link may provide a connection through a local network of a host computer or to data equipment operated by an Internet Service Provider (ISP). An ISP may, in turn, provide data communication services through the Internet. Accordingly, a computer 700 may send and receive commands, data, or combinations thereof, including program code, through one or more networks, a network link, and communication interface 702. Thus, a computer 700 may interface or otherwise communicate with a remote server (e.g., server 601), or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method comprising:
    displaying a current virtual reality (VR) environment of a VR presentation to a user via a VR display;
    receiving two-dimensional (2D) content from an external source via a hardware communication unit;
    searching the current VR environment to identify a display location corresponding to a 2D surface suitable for displaying the 2D content based on one or more display specifications of the 2D content;
    when a display location corresponding to a 2D surface suitable for displaying the 2D content is identified, displaying the 2D content at the display location of the current VR environment via the VR display;
    when no display location corresponding to a 2D surface suitable for displaying the 2D content is identified: sending a request for a corresponding virtual viewing environment having a corresponding display location corresponding to a 2D surface suitable for displaying the 2D content, receiving a virtual viewing environment and information of a display location for presenting the 2D content within the received virtual viewing environment; replacing the current VR environment with the received virtual viewing environment within the VR presentation, and displaying the 2D content at the display location of the received virtual viewing environment via the VR display,
    wherein the displaying comprises:
    extracting a plurality of 2D images of an object from the 2D content, wherein the object is depicted in the 2D content;
    generating a three-dimensional (3D) representation of the object using the extracted plurality of 2D images, wherein the generated 3D representation of the object is viewable from a plurality of viewing angles informed by the extracted plurality of 2D images; and
    rendering the current VR environment or the received virtual viewing environment to include the generated 3D representation of the object;
    wherein a position of the generated 3D representation of the object is different from the display location within the current VR environment or the received virtual viewing environment.

2. The method of claim 1, further comprising receiving content metadata of the 2D content from the external source.

3. The method of claim 2, wherein the received content metadata comprises information of the virtual viewing environment, and the method further comprises:
    changing at least one aspect of the current VR environment or the received virtual viewing environment using one or more 2D images from the 2D content;
    rendering the current VR environment or the received virtual viewing environment with the changed at least one aspect; and
    providing the rendered current VR environment or the received virtual viewing environment within the VR presentation.

4. The method of claim 2, further comprising:
    obtaining information of a content category of the 2D content from the received content metadata; and
    sending the request for the virtual viewing environment based on the content category.

5. The method of claim 2, wherein the received content metadata comprises the one or more display specifications of the 2D content.

6. The method of claim 5, wherein the received virtual viewing environment is specifically assigned to the 2D content according to the received content metadata.

7. The method of claim 5, wherein the received virtual viewing environment comprises link information to a source providing data for rendering the received virtual viewing environment.

8. The method of claim 1, wherein the received 2D content comprises link information to a source providing the 2D content.

9. The method of claim 1, wherein the display location corresponds to a virtual movie theater screen or virtual television display rendered within the current VR environment or the received virtual viewing environment.

10. A system comprising:
a virtual reality (VR) display;
a hardware receiver; and
one or more controllers configured to:
cause the VR display to display a current VR environment of a VR presentation;
receive, via the receiver, two-dimensional (2D) content from an external source;
search the current VR environment to identify a display location corresponding to a 2D surface suitable for displaying the 2D content based on one or more display specifications of the 2D content;
when a display location is identified for displaying the 2D content, cause the VR display to display the 2D content at the display location of the current VR environment via the VR display;
when no display location corresponding to a 2D surface suitable for displaying the 2D content is identified:
send a request for a corresponding virtual viewing environment having a corresponding display location corresponding to a 2D surface suitable for displaying the 2D content, receive, via the receiver, a virtual viewing environment and information of a display location for presenting the 2D content within the received virtual viewing environment, replace the current VR environment with the received virtual viewing environment within the VR presentation, and cause the VR display to display the 2D content at the display location of the received virtual viewing environment:
wherein the one or more controllers is further configured to:
extract a plurality of 2D images of an object from the 2D content, wherein the object is depicted in the 2D content;
generate a three-dimensional (3D) representation of the object using the extracted plurality of 2D images, wherein the generated 3D representation of the object is viewable from a plurality of viewing angles informed by the extracted plurality of 2D images; and
render the current VR environment or the received virtual viewing environment to include the generated 3D representation of the object;
wherein a position of the generated 3D representation of the object is different from the display location within the current VR environment or the received virtual viewing environment.

11. The system of claim 10, wherein the one or more controllers are further configured to receive, via the receiver, content metadata of the 2D content from the external source.

12. The system of claim 11, wherein the one or more controllers are further configured to:
obtain information of a content category of the 2D content from the received content metadata; and
send the request for the virtual viewing environment based on the content category.

13. The system of claim 11,
wherein the received content metadata comprises the one or more display specifications of the 2D content.

14. The system of claim 13, wherein the received virtual viewing environment is specifically assigned to the 2D content according to the received content metadata.

15. The system of claim 13, wherein the received virtual viewing environment comprises link information to a source providing data for rendering the received virtual viewing environment.

16. The system of claim 10, wherein the received 2D content comprises link information to a source providing the 2D content.

17. The system of claim 10, wherein the display location corresponds to a virtual movie theater screen or virtual television display rendered within the current VR environment or the received virtual viewing environment.

18. The system of claim 10, wherein:
the received content metadata comprises information of the virtual viewing environment; and
the one or more controllers are further configured to:
change at least one aspect of the current VR environment or the received virtual viewing environment using one or more 2D images from the 2D content;
render the current VR environment or the received virtual viewing environment with the changed at least one aspect; and
cause the VR display to provide the rendered current VR environment or the received virtual viewing environment within the VR presentation.

* * * * *